Aug. 2, 1932.   J. W. MACKENZIE   1,869,383
VALVE MECHANISM FOR INTERNAL COMBUSTION ENGINES
Filed Jan. 4, 1930

INVENTOR
Joseph W. Mackenzie
BY Chappell Earl
ATTORNEYS

Patented Aug. 2, 1932

1,869,383

UNITED STATES PATENT OFFICE

JOSEPH W. MACKENZIE, OF JACKSON, MICHIGAN

VALVE MECHANISM FOR INTERNAL COMBUSTION ENGINES

Application filed January 4, 1930. Serial No. 418,468.

The main object of this invention is to provide a valve mechanism for internal combustion engines which is noiseless and self-adjusting to take up any slack or lost motion therein.

Objects pertaining to details and economies of my invention will definitely appear from the description to follow. The invention is defined in the claim.

A structure which embodies the features of my invention is clearly illustrated in the accompanying drawing, in which.

Figures 1, 2:
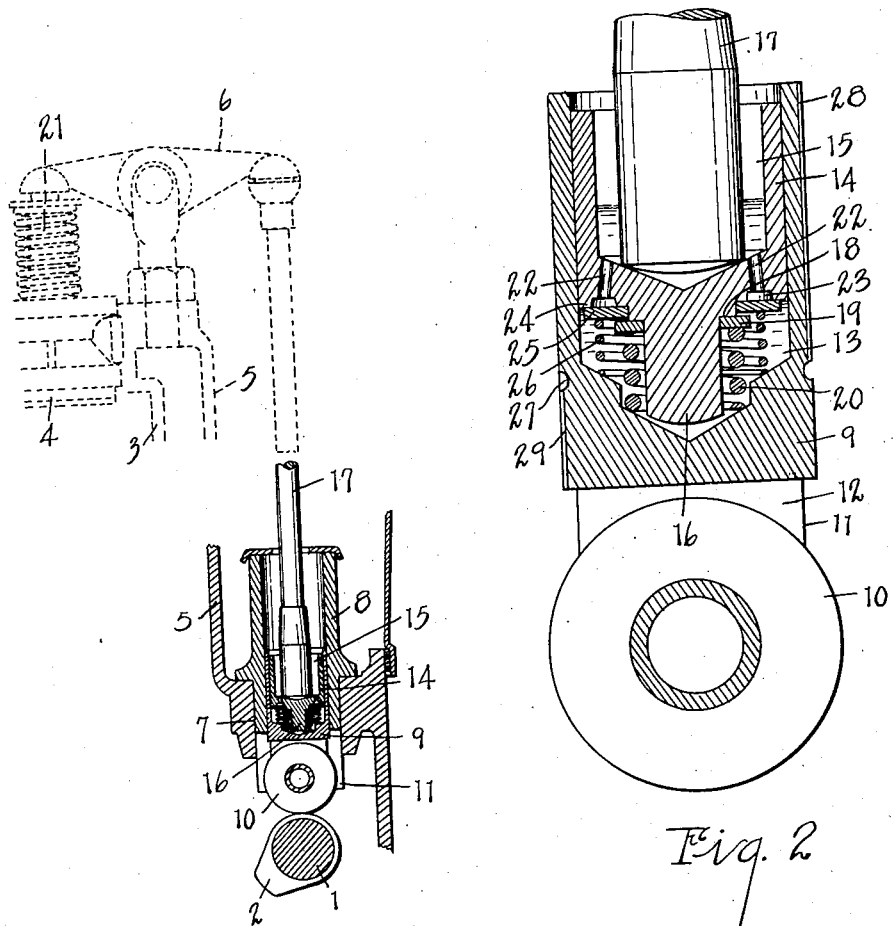
Fig. 1 is a fragmentary view of a single valve mechanism of an internal combustion engine, parts being shown in dotted lines and conventionally for convenience in illustration.
Fig. 2 is an enlarged fragmentary sectional view showing details of my valve mechanism.

Referring to the drawing, 1 represents the cam shaft of an internal combustion engine and 2 one of the valve actuating cams. 3 represents the cylinder, 4 one of the valves, 5 one of the outer jacket walls of the cylinder and 6 the valve lever coacting with the valve 4. The wall 5 of the cylinder is provided with an opening 7 in which the tubular guide 8 is seated. This guide is alined with the cam 2.

Reciprocating within the guide is a cylinder 9 carrying a roller 10 coacting with the cam. The cylinder is provided with arms 11 between which the tappet roller is mounted and the guide is slotted at 12 to receive the roller. The cylinder is closed at its lower end providing a reservoir 13 for a fluid, preferably oil.

The plunger 14 is arranged within the cylinder and provided with a fluid chamber or reservoir 15. The plunger is provided with a depending extension 16 constituting a stop coacting with the bottom of the cylinder.

The push rod 17 is connected at its upper end to the lever 6, its lower end resting within the plunger. The stop 16 is shouldered at 18 to receive the thrust collar 19 against which the upper end of the spring 20 is seated. The lower end of the spring seats on the bottom of the cylinder chamber so that this spring acts to urge the plunger and cylinder in opposite directions, holding the plunger yieldingly against the cam. The valve spring 21 is of greater tension or strength than that of the spring 20 so that the valve is not opened by the spring 20.

The chamber within the plunger is in communication with the chamber within the cylinder through ports or passages 22 which open to the annular passage 23 formed in the annular valve seat 24 on the plunger. The annular valve 25 is held yieldingly upon this valve seat 24 by means of the spring 26.

To lubricate the cylinder and its guide the cylinder is preferably provided with an annular external lubricant distributing groove 27 with a longitudinal groove 28 at one side leading from the top of the cylinder to the groove 27, and a longitudinal groove 29 on the opposite side leading to the lower end of the cylinder and positioned to discharge upon the tappet roller 10.

In the embodiment illustrated the lubricant supplied to the push rod will maintain a supply in the plunger, although there is little likelihood of this lubricant supplied thereto escaping or working out. In normal operation the space between the plunger and cylinder is filled with a fluid, preferably lubricant, as stated, and is confined therein except as it may gradually work between the walls of the plunger and the cylinder which provides efficient lubrication between these parts. The lubricant thus escaping, however, is returned to the plunger.

The fluid between these members constitutes a relatively incompressible medium causing the piston to be carried up with the cylinder member which is, in effect, a tappet. This motion is transmitted to the push rod and through the parts described to the valve.

As the cam rotates to carry its lift from under the cylinder the spring 21 forces the piston downwardly and this force is communicated through the fluid to the cylinder, any further possible movement being taken up by the spring 20 which would cause a partial vacuum within the cylinder, permitting fluid to flow into the same past the valve, thus taking up any lost motion and providing a complete seating of the engine valve, and at the same time providing quiet operation.

I have illustrated and described my improvements in a very simple and practical embodiment. Should the device be operated without fluid, or the fluid become solidified by cold so that it would not flow freely, or the valve fail to function, the device is still operative owing to the stop between the parts permitting only a very limited relative movement. This, however, is all that is required to secure the desired results.

Having thus described my invention what I claim as new and desire to secure by Letters Patent is:

In a valve mechanism, the combination with an actuating cam and push rod, of a tubular guide, a cylinder reciprocating in said guide in coacting relation with said cam, said cylinder being closed at its lower end, a plunger within said cylinder coacting with said push rod and having a fluid chamber therein and a depending shouldered stop coacting with the bottom of the cylinder to limit the relative movement of the cylinder and plunger, said plunger having an annular downwardly facing valve seat with an annular channel therein and ports connecting said channel to said fluid chamber, an annular valve coacting with said valve seat, a valve seating spring, a thrust collar arranged on said shoulder of said stop limiting the opening movement of said valve, and a spring within said cylinder seating on said collar and acting to yieldingly urge the cylinder against said cam.

In witness whereof I have hereunto set my hand.

JOSEPH W. MACKENZIE.